(12) United States Patent
Sayeed et al.

(10) Patent No.: US 8,947,495 B2
(45) Date of Patent: Feb. 3, 2015

(54) TELEPRESENCE APPARATUS FOR IMMERSION OF A HUMAN IMAGE IN A PHYSICAL ENVIRONMENT

(71) Applicants: Zulfiquar Sayeed, Hightstown, NJ (US); James Kotch, Lakewood, NJ (US)

(72) Inventors: Zulfiquar Sayeed, Hightstown, NJ (US); James Kotch, Lakewood, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 131 days.

(21) Appl. No.: 13/705,965

(22) Filed: Dec. 5, 2012

(65) Prior Publication Data

US 2013/0141519 A1 Jun. 6, 2013

Related U.S. Application Data

(60) Provisional application No. 61/567,332, filed on Dec. 6, 2011.

(51) Int. Cl.
*H04N 7/15* (2006.01)
*H04N 7/14* (2006.01)

(52) U.S. Cl.
CPC . *H04N 7/15* (2013.01); *H04N 7/142* (2013.01)
USPC .................. 348/14.08; 348/14.01; 348/14.07; 348/14.09; 348/14.16; 348/373; 351/212; 355/1; 358/521; 359/24; 378/205; 382/154; 382/159; 382/274; 623/8; 701/117; 715/753

(58) Field of Classification Search
CPC ............................... H04N 7/15; A61B 5/1077
USPC ........... 348/14.08, 208.15, 211.6, 222.1, 371, 348/373, 14.01, 14.07, 14.09, 14.16, 212; 351/212; 358/521; 378/205; 382/19, 382/274, 154, 159; 701/117; 355/1; 359/24; 623/8; 715/753
See application file for complete search history.

(56) References Cited

U.S. PATENT DOCUMENTS

| | | | |
|---|---|---|---|
| 4,831,645 A * | 5/1989 | Guenther et al. ............. | 378/205 |
| 4,862,277 A * | 8/1989 | Iwaibana ................. | 348/208.15 |
| 4,875,225 A * | 10/1989 | Hunold ........................ | 378/98.5 |
| 5,023,651 A * | 6/1991 | Burch et al. ...................... | 355/1 |
| 5,159,361 A * | 10/1992 | Cambier et al. ............. | 351/212 |
| 6,323,971 B1 * | 11/2001 | Klug .............................. | 359/24 |
| 6,507,357 B2 * | 1/2003 | Hillis et al. ................ | 348/14.16 |
| 6,755,861 B2 * | 6/2004 | Nakao ................................ | 623/8 |
| 6,792,140 B2 * | 9/2004 | Matusik et al. ............... | 382/154 |
| 6,803,946 B1 * | 10/2004 | Wakiyama et al. ......... | 348/211.6 |
| 6,909,451 B1 * | 6/2005 | Latypov et al. ............ | 348/14.07 |
| 7,006,122 B2 * | 2/2006 | Suzuki ....................... | 348/14.08 |

(Continued)

*Primary Examiner* — Gerald Gauthier
(74) *Attorney, Agent, or Firm* — McCormick, Paulding & Huber LLP

(57) ABSTRACT

A telepresence device allows a remote meeting participant to establish a telepresence at a remote meeting location. The telepresence device provides a video image of the remote meeting participant on a video display screen at a meeting location To enhance the visual sensation that the remote person is present at the meeting location, the telepresence device may display the silhouette image of the remote meeting participant without the image of the background scene of the remote participant's location (e.g., office, home or home office). Further, the telepresence device may be equipped with a rear-facing camera that captures a video image of the background scene behind the telepresence device at the meeting location. The silhouette image of the remote meeting participant may be superimposed on the video image of the background scene at the meeting location, which is captured by the rear-facing camera.

20 Claims, 9 Drawing Sheets

(56) References Cited

U.S. PATENT DOCUMENTS

| | | | |
|---|---|---|---|
| 8,139,122 B2* | 3/2012 | Rolston | 348/222.1 |
| 8,233,028 B2* | 7/2012 | Erhart et al. | 348/14.09 |
| 8,234,578 B2* | 7/2012 | Ferren et al. | 715/753 |
| 8,279,254 B2* | 10/2012 | Goose et al. | 348/14.01 |
| 8,625,023 B2* | 1/2014 | Rolston | 348/371 |
| 8,692,930 B2* | 4/2014 | Rolston | 348/373 |
| 2003/0020974 A1* | 1/2003 | Matsushima | 358/521 |
| 2003/0191577 A1* | 10/2003 | Decaux | 701/117 |
| 2009/0310855 A1* | 12/2009 | Gennari et al. | 382/159 |
| 2011/0188776 A1* | 8/2011 | Kuwata et al. | 382/274 |
| 2013/0141519 A1* | 6/2013 | Sayeed et al. | 348/14.08 |

* cited by examiner

TELEPRESENCE APPARATUS FOR IMMERSION OF A HUMAN IMAGE IN A PHYSICAL ENVIRONMENT

CROSS REFERENCE TO RELATED APPLICATION

This application claims the benefit under 35 U.S.C. §119 (e) of U.S. Provisional Application No. 61/567,332, filed on Dec. 6, 2011, which is hereby incorporated by reference in its entirety.

FIELD

This specification relates generally to two-way multimedia communications, and more particularly to methods and apparatus for enabling an individual to participate in a meeting from a remote location.

BACKGROUND

Modern communication technologies enable people to conduct meetings without being physically present at the same location. It has become commonplace for individuals at different locations to use telephone conferencing and/or video communications technologies to conduct business meetings, conference calls, and other forms of interaction. Existing communication systems used to conduct such meetings typically employ a video display screen displaying an image of a remote participant including the background of the remote participant's location (e.g., home, home office).

SUMMARY

In one embodiment, a video teleconferencing apparatus comprises a video display screen; a support member configured to support the screen; a video camera mounted on the support member, where the video camera having a line of sight directed rearward of the screen; and an image-processing module configured to superimpose a silhouette image of a remote participant on a local background image captured by the video camera to produce a superimposed image, and to display the superimposed image on the video display screen. The silhouette image is an image of a human body or object that has been isolated from a background image. More particularly, the silhouette image may be a video image of only the body of the remote participant, which is isolated from a video image of the remote participant that includes the remote participant's background scene.

Some embodiments of the above video teleconferencing apparatus further comprise a base unit on which the support member is rotatably supported.

Some embodiments of any of the above video teleconferencing apparatuses further comprise a control module configured to rotate the base unit, and thereby rotate the video display screen, in response to commands generated at a remote location.

Some embodiments of any of the above video teleconferencing apparatuses further comprise a communication interface in communication with the image-processing module and with a remote device at the remote participant's location.

In some embodiments of any of the above video teleconferencing apparatuses, the communication interface is configured to receive a video image of the remote participant from the remote device.

In some embodiments of any of the above video teleconferencing apparatuses, the image-processing module is configured to extract a silhouette image of the remote participant from the video image received from the remote device.

In some embodiments of any of the above video teleconferencing apparatuses, the communication interface is configured to receive the silhouette image of a remote participant from the remote device.

Some embodiments of any of the above video teleconferencing apparatuses further comprise a powered base on which the base unit is removably supported, such that the base unit along with the support member, video display screen and video camera can be removed from the powered base without being encumbered by power connectors or communication connectors.

In some embodiments of any of the above video teleconferencing apparatuses, the powered base comprises an induction-charging unit configured to inductively charge a rechargeable battery on the base unit.

In some embodiments of any of the above video teleconferencing apparatuses, the powered base comprised a wireless communication unit configured to communicate with a wireless communication unit of the base unit.

In one embodiment, a computer-implemented method for video teleconferencing, comprises receiving, by an image-processing module, a video image of a local background captured by a video camera directed behind a telepresence device at a local meeting location; superimposing, by the image-processing module, a silhouette image of a remote participant on the video image of the local background captured by the video camera to produce a superimposed image, and displaying, by the image-processing device, the superimposed image on a video display screen on the telepresence device.

Some embodiments of the above computer-implemented method further comprise receiving, by the image-processing module, a video image of the remote participant from a remote device.

Some embodiments of any of the above computer-implemented methods further comprise extracting, by the image-processing module, a silhouette image of the remote participant from the video image received from the remote device.

Some embodiments of any of the above computer-implemented methods further comprise receiving, by the image-processing module, the silhouette image of the remote participant from the remote device.

Some embodiments of any of the above computer-implemented methods further comprise rotating the telepresence device in response to commands generated at a remote location.

In one embodiment, a non-transitory, tangible computer-readable medium storing instructions adapted to be executed by a computer processor to perform a method for video teleconferencing comprising receiving, by the computer processor, a video image of a local background captured by a video camera directed behind a telepresence device at a local meeting location; superimposing, by the computer processor, a silhouette image of a remote participant on the video image of the local background captured by the video camera to produce a superimposed image, and displaying, by the computer processor, the superimposed image on a video display screen on the telepresence device.

In some embodiments of the above tangible computer-readable medium, the method further comprises receiving, by the computer processor, a video image of the remote participant from a remote device.

In some embodiments of any of the above tangible computer-readable medium, the method further comprises extracting, by the computer processor, a silhouette image of the remote participant from the video image received from the remote device.

In some embodiments of any of the above tangible computer-readable medium, the method further comprises receiving, by the computer processor, the silhouette image of the remote participant from the remote device.

In some embodiments of any of the above tangible computer-readable medium, the method further comprises rotating the telepresence device in response to commands generated at a remote location.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific embodiments disclosed. In the drawings.

DETAILED DESCRIPTION

Before the various embodiments are described in further detail, it is to be understood that the invention is not limited to the particular embodiments described. It is also to be understood that the terminology used is for the purpose of describing particular embodiments only, and is not intended to limit the scope of the claims of the present application.

The patent application entitled "Method and apparatus for two-way multimedia communications" filed by E. L. Sutter, Jr., on Apr. 30, 2010 as U.S. patent application Ser. No. 12/770,991 and subsequently published as U.S. Publication No. 2011/0267421 is hereby incorporated by reference in its entirety.

The present application is directed to systems and methods that allow a remote meeting participant to establish a telepresence (or virtual presence) at a remote meeting location and participate in a meeting remotely. In particular, the remote participant may establish a telepresence at a remote meeting location by means of a telepresence device, which provides a video image of the remote meeting participant on a video display screen and allows the remote participant to rotate the video display screen and pan the remote meeting location as the meeting progresses and the active conversational role passes from one participant to another. To enhance the visual sensation that the remote person is present at the meeting location, the telepresence device may display a silhouette image of the remote meeting participant without the image of the background scene of the remote participant's location (e.g., office, home or home office). The silhouette image is an image of a human body or object that has been isolated from a background image. More particularly, the silhouette image may be a video image of only the body of the remote participant, which is isolated from a video image of the remote participant that includes the remote participant's background scene.

Further, the telepresence device may be equipped with a rear-facing camera that captures a video image of the background scene behind the telepresence device at the meeting location. Accordingly, the silhouette image of the remote meeting participant may be superimposed on the video image of the background scene at the meeting location, which is captured by the rear-facing camera. Thus, by incorporating the silhouette image of the remote participant with the background image behind the telepresence device at the meeting location, the telepresence device may create the illusion that the remote participant is actually at the meeting location.

Figure 1:
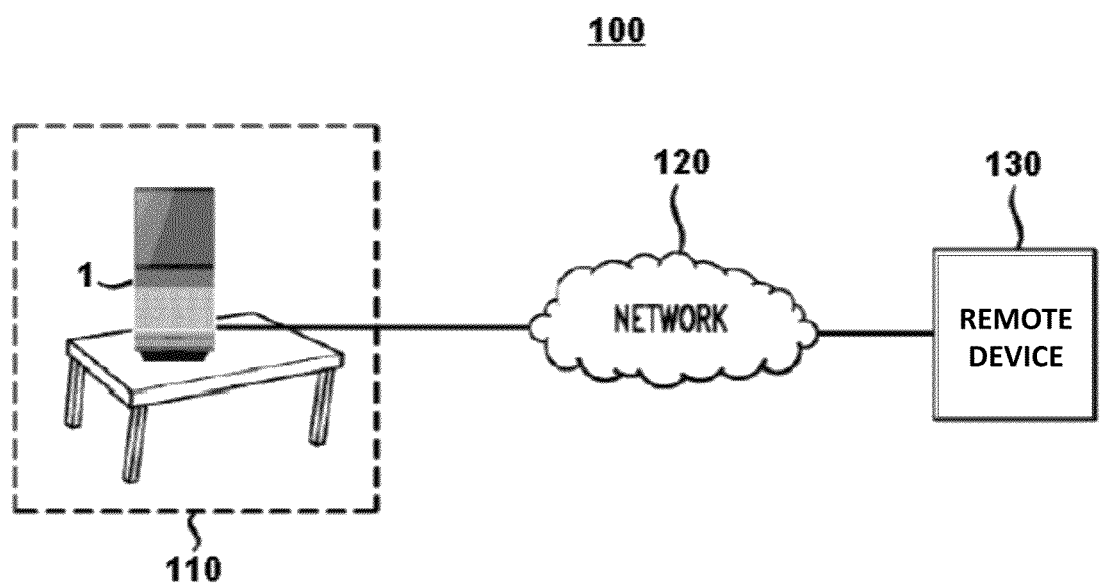
FIG. 1 shows an example of a communication system, in accordance with an embodiment of the invention.

FIG. 1 illustrates a communication system 100 that enables an individual to participate in a meeting from a remote location. Communication system 100 comprises a telepresence device 1 located at a meeting location 110, a network 120, and a remote device 130. The telepresence device 1 is placed at a selected meeting location 110, for example on a table among individuals who are present in a conference room. The telepresence device 1 is linked to the remote device 130 present at a remote location via the network 120.

The network 120 may comprise one or more of a number of different types of networks, such as, for example, an intranet, a local area network (LAN), a wide area network (WAN), an internet, Fibre Channel-based storage area network (SAN) or Ethernet. Other networks may be used. Alternatively, the network 120 may comprise a combination of different types of networks. In some embodiments, the telepresence device 1 may be linked to the remote device 130 via a direct connection.

A remote participant at a location remote from the meeting location 110 operates the remote device 130. The remote device 130 conveys, to the remote participant, audio and video signals received from the telepresence device 1, and transmits audio and video signals to the telepresence device 1. The remote device 130 also transmits to the telepresence device 1 control signals received from the remote participant. In this manner, the remote participant may employ the remote device 130 to control the telepresence device 100 remotely. By selective placement of the telepresence device 1 at the meeting location 110, the telepresence device 1 may enable the remote participant to receive audio and video signals from the meeting location 110 in a manner that simulates the sensation of being physically present at the meeting location.

Figure 8:
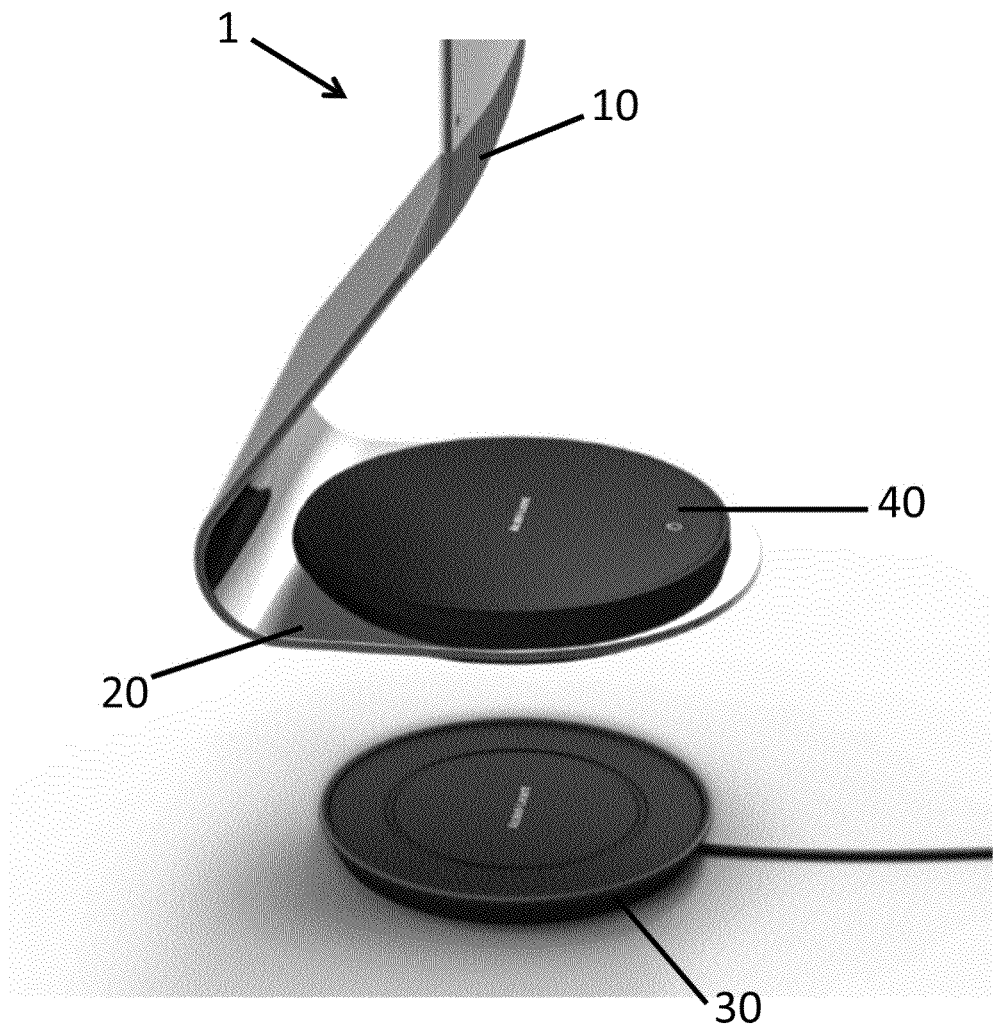
FIG. 8 shows a close-up view of the base unit and powered base of the exemplary device shown in FIGS. 3-7.
Figure 9:
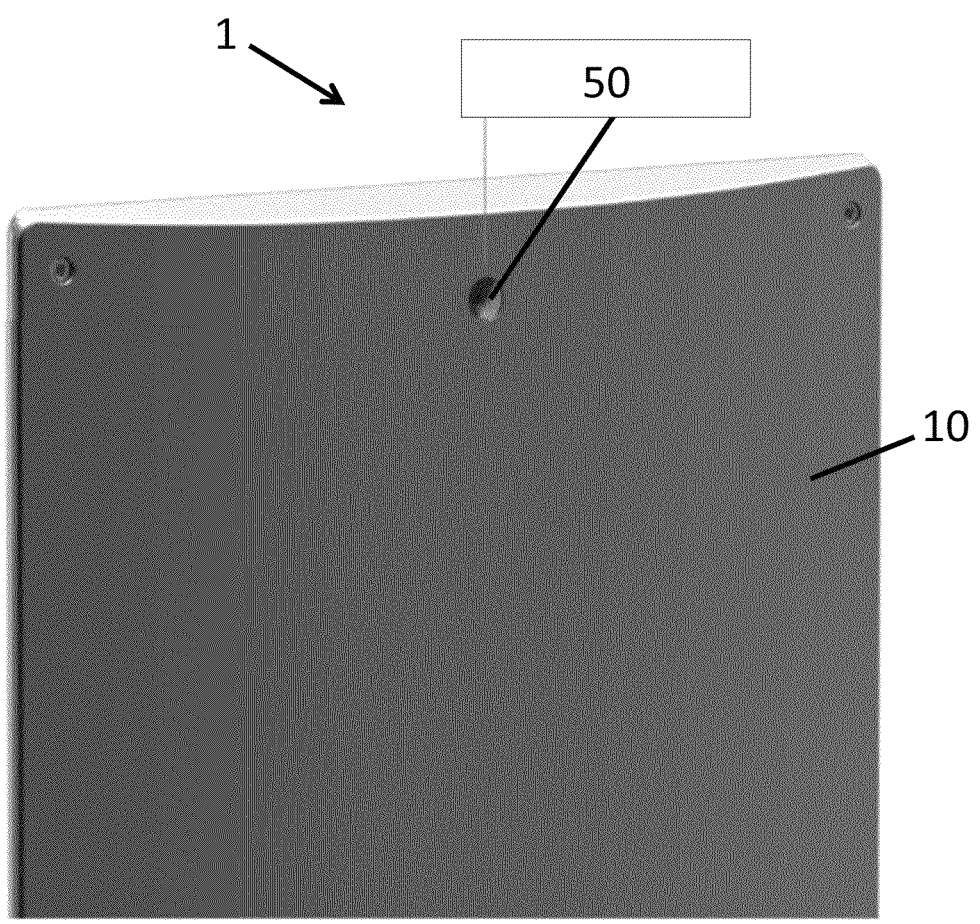
FIG. 9 shows a close-up view of the back side the exemplary device shown in FIGS. 3-8.

FIGS. 3-9 show an exemplary embodiment of the telepresence device 1. As shown in FIGS. 3-9, the exemplary telepresence device 1 comprises a video display screen 5 mounted near the top of a support member 10. As best shown in FIG. 8, the support member 10 has a substantially horizontal base portion 20 configured to rest on a powered base 30 and to be removed from the powered base 30. As shown, the support member 10 is adapted to be lifted off of the powered base 30 and placed anywhere within wireless communication range of the powered base 30 without being encumbered by power connectors or communication connectors. The horizontal base portion 20 includes a functional base unit 40, which may be integrally formed with the base portion 20 or separately formed and attached to the base portion 20.

Figure 4:
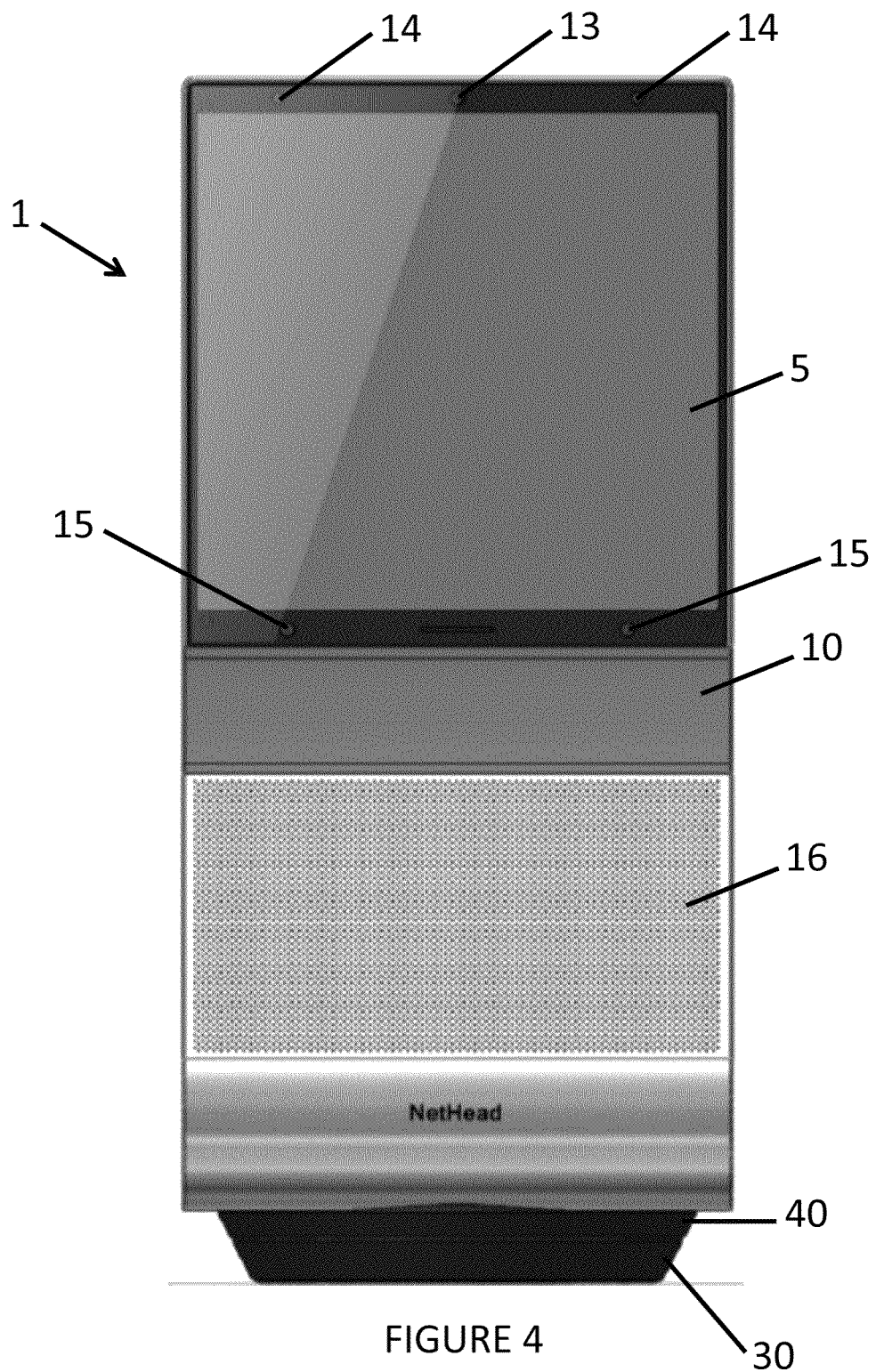
FIG. 4 shows a front view of the exemplary device shown in FIG. 3.
Figure 5:
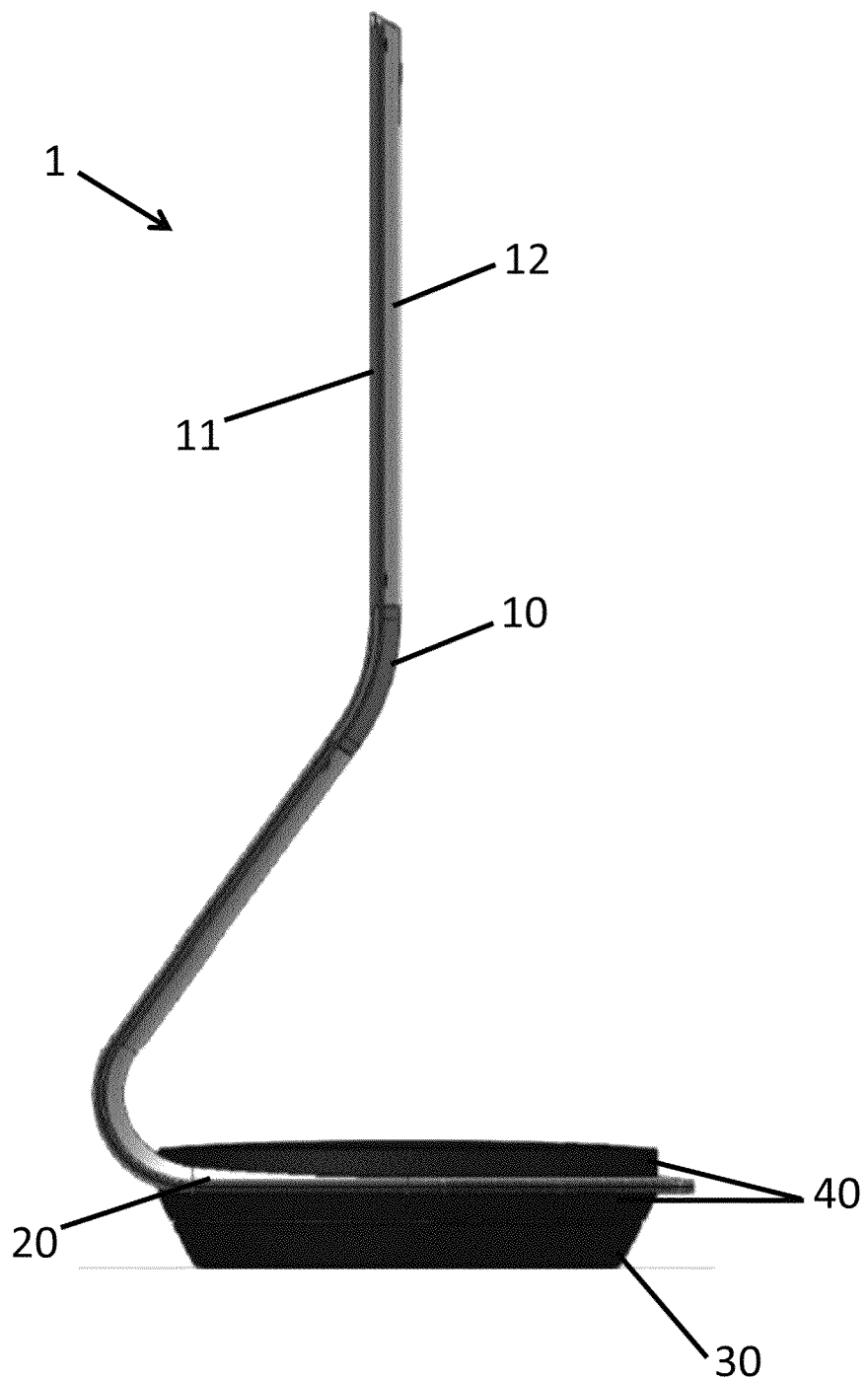
FIG. 5 shows a profile view of the exemplary device shown in FIGS. 3-4.
Figure 6:
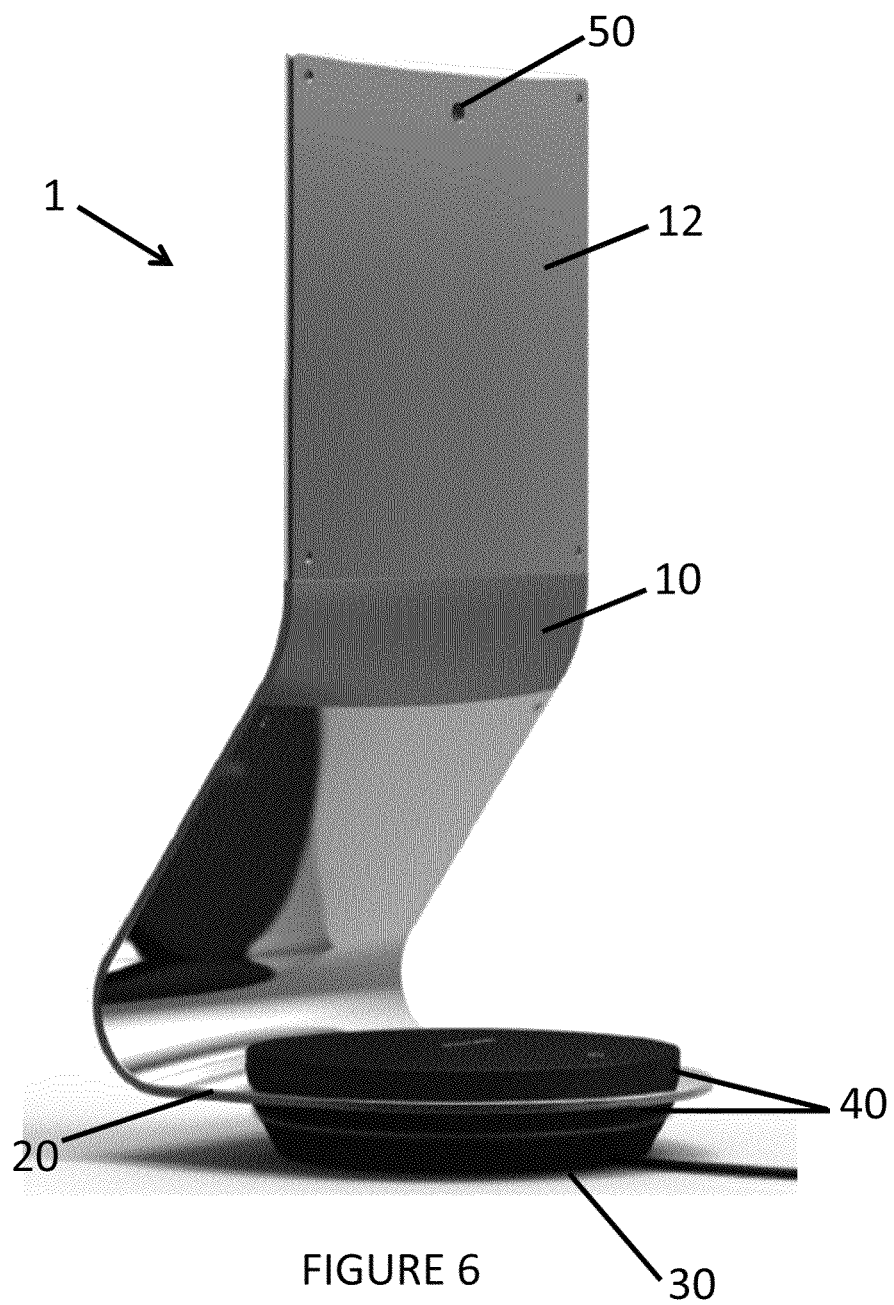
FIG. 6 shows a back profile view of the exemplary device shown in FIGS. 3-5.
Figure 7:
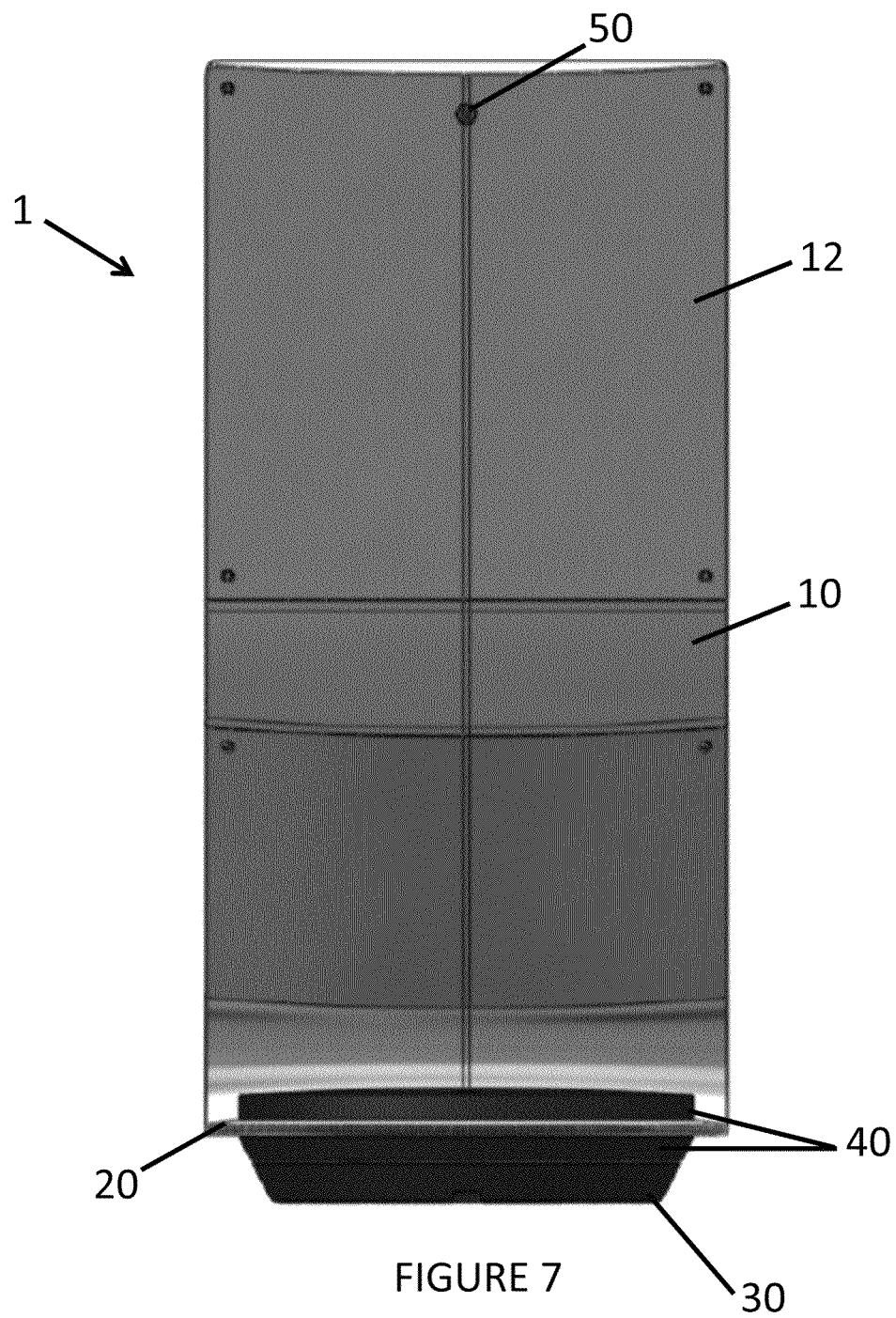
FIG. 7 shows a back view of the exemplary device shown in FIGS. 3-6.

As shown in the Figures, the support member 10 has a front side 11 and a back side 12. Referring to FIG. 4, a forward-facing camera 13, a stereophonic microphone pair 14, and sensing devices 15 (such as infrared or acoustic sensing devices for detecting the proximity and bearings of human conference participants) may be mounted on the front side of the support member 10. A loudspeaker or stereophonic loudspeaker pair 16 may also be mounted on the front side of support member, exemplarily at a location below screen 5. Now referring to FIG. 9, a rear-facing camera 50 may be positioned near the uppermost edge of the back side 12 of the support member 10, such that the rear-facing camera 50 captures a video image of the background scenery beging the telepresence device 1. In other words, the rear-facing camera is configured to have a line of sight opposite to the line of sight of the forward-facing camera 13, and rearward of the video display screen 5.

Functional base unit 40 may comprise a processor, a communication interface, a memory and a transceiver. The processor may control various operations of functional base unit 40 by executing computer program instructions which various computational and communication functions described herein. The computer program instructions may be stored in a non-transitory computer readable medium such as a random access memory (RAM), one or more disk drives, one or more optical disks, one or more tape drives, etc. Processor may comprise hardware, software, or a combination of hardware and software. For example, in one embodiment, processor comprises operating system software controlled by hardware, such as a central processing unit (CPU).

Among other things, the processor is configured to execute an image-processing module. The image-processing module is configured to receive a video image signal of the background of the telepresence device 1 from the rear-facing camera 50 of the telepresence device 1. Further, the image-processing module superimposes a silhouette image of a remote participant on the background image as captured by the rear-facing camera 50. The silhouette image is a video image of the remote participant that has been isolated from the remote participant's background scene. The remote device 130 situated in the remote location captures a video image of the remote participant, including the background scene at the remote participant's location. A silhouette extraction program may be executed to produce a silhouette image of the remote participant by isolating a video image of the remote participant from the remote participant's background scene. In one embodiment, the silhouette extraction program may be executed at the remote location and then the silhouette image may be sent to the image-processing module of the telepresence device 1 via network 120. In another embodiment, the image of the remote participant may be sent to the image processing module of the telepresence device 1 via the network 120 and then the silhouette extraction program may be executed by the image-processing module to produce a silhouette image of the remote participant by isolating the video image of the remote participant from the remote participant's background scene.

Figure 2:
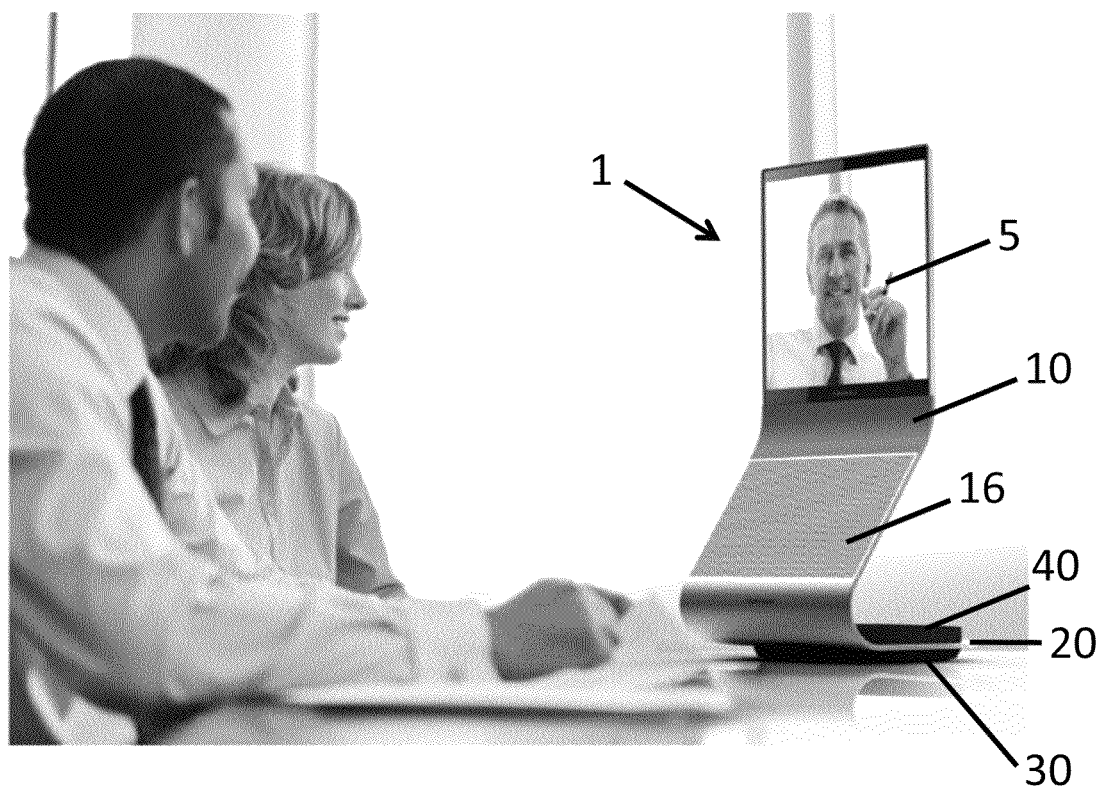
FIG. 2 shows an exemplary device in a meeting room.
Figure 3:
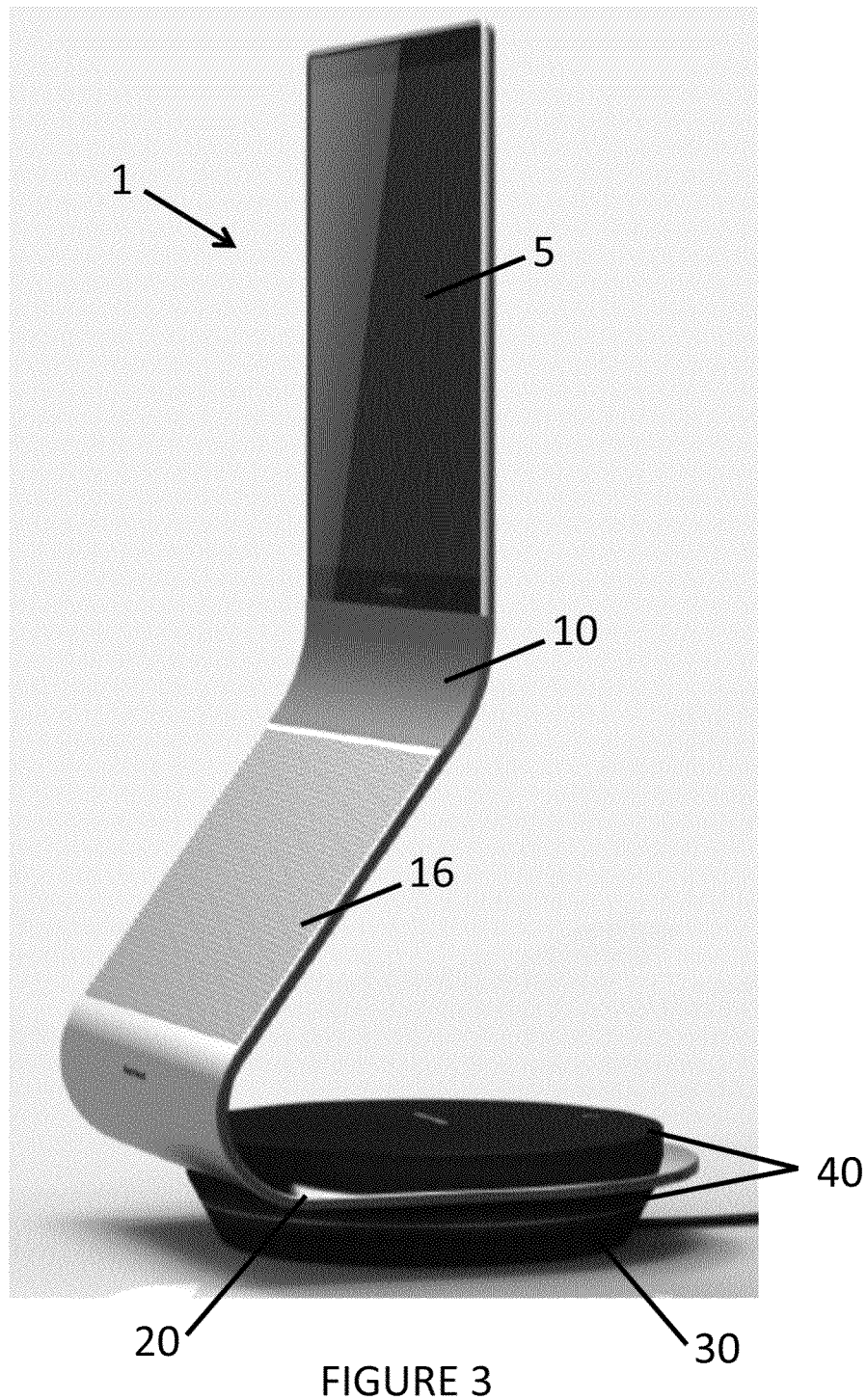
FIG. 3 shows a front profile view of the exemplary device shown in FIG. 2.

Once the image-processing module of the telepresence device 1 has the silhouette image of the remote participant, the image-processing module superimposes the silhouette image of the remote participant on a background image of the local meeting location captured by the rear-facing camera, and displays the superimposed image on the video display screen 5. The rear-facing camera is used to emulate the background of the physical conference room, so that to the physically present conference participants, the video display screen will appear to be transparent. Thus, for example, FIG. 2 shows that the window panels 60, which constitute a physical portion of the background view as seen from within the conference room, are also displayed on the video display screen as image element 70. The montage of the silhouette image combined with the view captured by the rear-facing camera is life-like, and it creates the illusion that the remote user is actually in the room. This produces the enhanced experience of physical immersion.

The communication interface may be configured to provide a communication gateway through which data may be transmitted between components of functional base unit 40 and the network 120 via the powered base 30. For example, the communication interface may transmit to the remote device 130, via network 120, audio signals received by the microphones 14 and video signals received by the forward-facing camera 13. The communication interface may also be configured to receive audio signals and video signals from the remote device 130, via the network 120, and transmit the audio and video signals to the speakers 14, and to video display screen 5, respectively. The communication interface may also receive control signals received from the remote device 130, and transmit the control signals to a control module of the functional base unit 40. In various embodiments, the communication interface may be implemented using a number of different mechanisms, such as one or more enterprise systems connection cards, modems, or network interfaces. Other types of interfaces may be used.

The memory of functional base unit 40 may be configured to be accessed by the processor and/or other components of functional base unit 40 to store various types of information. The memory of functional base unit 40 may comprise any one or more of a variety of different types of non-transitory computer readable media, such as random access memory (RAM), one or more disk drives, one or more optical disks, one or more tape drives, etc. Other types of memory devices may be used. The wireless communication unit of functional base unit 40 is adapted to wirelessly communicate with powered base 30 and, through the powered base 30, to external communication networks of various kinds, which may include, e.g., local WiFi and Ethernet networks, as well as the public telephone network and the internet.

Functional base unit 40 may also include a rechargeable battery, which is adapted to be inductively charged by the power base 30, for use as a power source when separated from powered base 30. Functional base unit 40 may also includes a motor and a mechanical linkage for rotating support member 10 about a vertical axis. For such purpose, horizontal base portion 20 may be fixed, e.g., to an underlying rotatable turntable (not shown in the Figures). In such a configuration, the motor may be drivingly connected, through base portion 20 and the turntable, to a non-rotating base plate that underlies the turntable and to which the turntable is rotatably mounted. The functional base unit 40 may comprise one or more electromechanical components such as servos, motors, control circuitry, gears, etc., configured to enable the support member 10 to be rotated in response to control signals.

The functional base unit 40 may also comprise one or more microprocessors and memory devices to facilitate its operation. For example, the functional base unit 40 may comprise a control module. The control module may be configured to receive control signals from remote the control device 130 (shown in FIG. 1), and to control the movement of support member 10 in response to the control signals. For example, the control module may generate electrical signals and transmit such signals to servos and/or other components in functional base unit 40 in response to control signals received from the remote device 130. The control module may also control functions of the forward-facing camera 13, video display screen 5, speakers 16, and microphones 14 based on control signals received from remote device 130.

The control module may comprise a software program that includes multiple modules or subroutines providing respective services or functions. In other embodiments, the control module may comprise multiple software programs. In alternative embodiments, the control module may comprise hardware, or a combination of hardware and software. Further, the control module may comprise a non-transitory computer readable medium, such as a magnetic disk, magnetic tape, or optical disk that includes instructions in the form of computer code operable to perform various functions. In some embodiments, some or the entire control module may comprise instructions in the form of computer code that are stored in the memory of functional base unit 40.

The powered base 30 may include an induction charging unit and a wireless communication unit. The induction-charging unit may be configured to inductively charge the rechargeable battery of the functional base 40. The wireless communication unit of powered base 30 may be configured to communicate with the wireless communication unit of functional base unit 40. Further the wireless communication unit of powered base 30 may be connected to and configured to communicate with external communication networks of various kinds, such as local WiFi and Ethernet networks, as well as the public telephone network and the internet. Thus, functional base unit 40 configured to wirelessly communicate with powered base 30 and, through the powered base 30, to external communication networks of various kinds, which may include, e.g., local WiFi and Ethernet networks, as well as the public telephone network and the internet.

The telepresence device 1 may be dimensioned so that the eye-level of the remote participant's image can be brought to the eye-level of the participants in the physical conference room. By using the motor in the functional base unit 40, the video display screen can be rotated so that the remote participant can pan the physical conference room as the meeting progresses and the active conversational role passes from one participant to another.

Other embodiments may include a transparent LCD/LED monitor. In such embodiments, the display portion of the immersion device will appear to be as transparent as a pane of glass. When a remote user activates the device, the operation of silhouette extraction will cause the remote user's silhouette image to appear without a surrounding frame, as though it were floating above the base of the device.

While various embodiments have been described, it will be appreciated by those of ordinary skill in the art that modifications can be made to the various embodiments without departing from the spirit and scope of the invention as a whole.

The invention claimed is:

1. A video teleconferencing apparatus, comprising:
a video display;
a support member configured to support the display;
a video camera mounted on the support member, the video camera having a line of sight directed rearward of the display; and
an image-processing module configured to superimpose a silhouette image on an image captured by the video camera to produce a superimposed image, and to display the superimposed image on the video display screen.

2. The video teleconferencing apparatus of claim 1 further comprising a base unit on which the support member is rotatably supported.

3. The video teleconferencing apparatus of claim 1 further comprising a control module configured to rotate the base unit, and thereby rotate the video display screen, in response to commands generated at a remote location.

4. The video teleconferencing apparatus of claim 1 further comprising a communication interface in communication with the image-processing module and with a remote device at the remote participant's locations;
wherein the silhouette image is an image of the silhouette of the remote participant and the image captured by the video camera is an image of a local background.

5. The video teleconferencing apparatus of claim 4, wherein the communication interface is configured to receive a video image of the remote participant from the remote device.

6. The video teleconferencing apparatus of claim 4, wherein the image-processing module is configured to extract a silhouette image of the remote participant from the video image received from the remote device.

7. The video teleconferencing apparatus of claim 4, wherein the communication interface is configured to receive the silhouette image of a remote participant from the remote device.

8. The video teleconferencing apparatus of claim 1 further comprising a powered base on which the base unit is removably supported, such that the base unit along with the support member, video display screen and video camera have removable functionality from the powered base.

9. The video teleconferencing apparatus of claim 8, wherein the powered base comprises an induction-charging unit configured to inductively charge a rechargeable battery on the base unit.

10. The video teleconferencing apparatus of claim 8, wherein the powered base comprised a wireless communication unit configured to communicate with a wireless communication unit of the base unit.

11. A computer-implemented method for video teleconferencing, comprising the steps of:
receiving, by an image-processing module, a video image of a local background captured by a video camera directed behind a telepresence device at a local meeting location;
superimposing, by the image-processing module, a silhouette image of a remote participant on the video image of the local background captured by the video camera to produce a superimposed image, and
displaying, by the image-processing device, the superimposed image on a video display screen on the telepresence device.

12. The computer-implemented method of claim 11 further comprising:
receiving, by the image-processing module, a video image of the remote participant from a remote device.

13. The computer-implemented method of claim 12 further comprising:
extracting, by the image-processing module, a silhouette image of the remote participant from the video image received from the remote device.

14. The computer-implemented method of claim 11 further comprising:
receiving, by the image-processing module, the silhouette image of the remote participant from the remote device.

15. The computer-implemented method of claim 11 further comprising:
rotating the telepresence device in response to commands generated at a remote location.

16. A non-transitory, tangible computer-readable medium storing instructions adapted to be executed by a computer processor to perform a method for video teleconferencing, comprising the steps of:
- receiving, by the computer processor, a video image of a local background captured by a video camera directed behind a telepresence device at a local meeting location;
- superimposing, by the computer processor, a silhouette image of a remote participant on the video image of the local background captured by the video camera to produce a superimposed image, and
- displaying, by the computer processor, the superimposed image on a video display screen on the telepresence device.

17. The non-transitory, tangible computer-readable medium of claim 16, wherein the method further comprises:
- receiving, by the computer processor, a video image of the remote participant from a remote device.

18. The non-transitory, tangible computer-readable medium of claim 17, wherein the method further comprises:
- extracting, by the computer processor, a silhouette image of the remote participant from the video image received from the remote device.

19. The non-transitory, tangible computer-readable medium of claim 16, wherein the method further comprises:
- receiving, by the computer processor, the silhouette image of the remote participant from the remote device.

20. The non-transitory, tangible computer-readable medium of claim 16, wherein the method further comprises:
- rotating the telepresence device in response to commands generated at a remote location.

\* \* \* \* \*